United States Patent Office 3,841,961
Patented Oct. 15, 1974

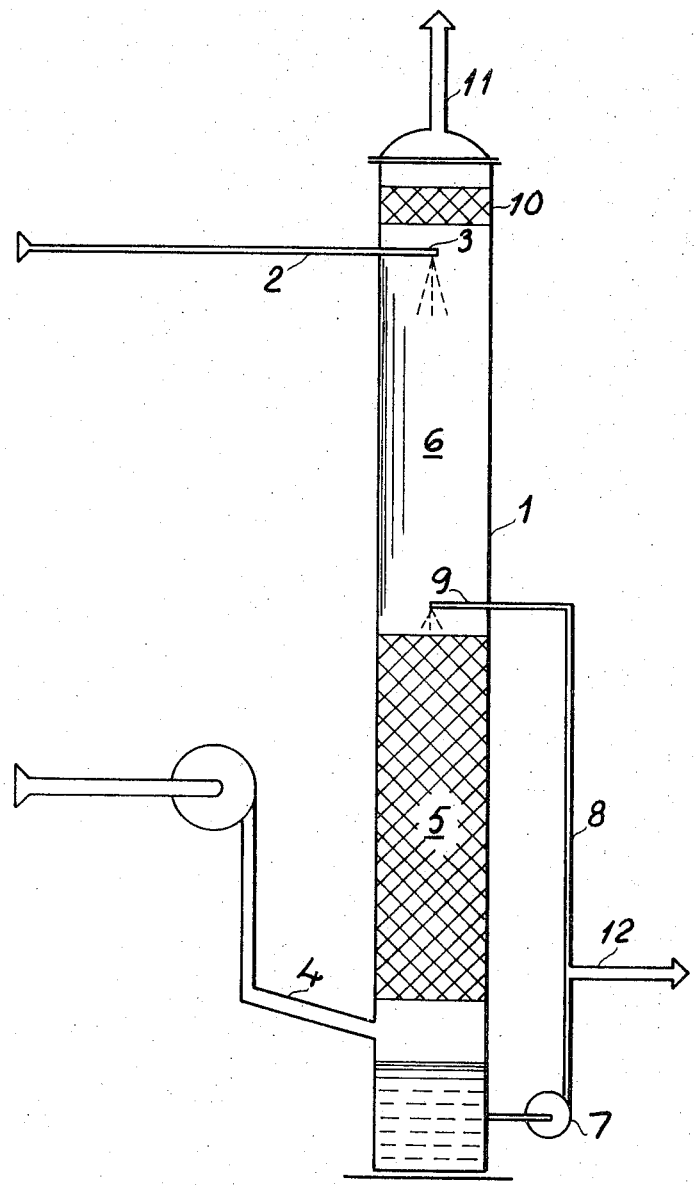

3,841,961
METHOD FOR THE CARBONATION OF SULPHIDE-CONTAINING GREEN LIQUOR SOLUTIONS
Erik Viktor Saiha, Heinola, Finland, assignor to Oy Tampella AB, Tampere, Finland
Continuation-in-part of abandoned applications Ser. No. 596,556, Nov. 23, 1966, and Ser. No. 62,098, Aug. 7, 1970. This application Dec. 27, 1971, Ser. No. 212,786
Int. Cl. D21c 11/00, 11/06
U.S. Cl. 162—29                                   2 Claims

ABSTRACT OF THE DISCLOSURE

A method for the carbonation of sulphide-containing green liquor solutions wherein green liquor and carbonation gas are passed counter-currently through an absorption tower using a high volume ratio of gas to liquid, some carbonation gas is absorbed in the solution in a packed lower portion of the tower for increasing contact surface, so that the main portion of the sulphide content of the solution is converted to bisulphide, carbonate or bicarbonate and a minor portion is liberated as hydrogen sulphide, and thereafter the liberated hydrogen sulphide is selectively re-absorbed by finely divided fresh sulphide-containing solution sprayed into an unpacked upper portion of the tower.

CROSS REFERENCE TO RELATED APPLICATIONS

This application is a continuation-in-part of my prior copending applications Ser. Nos. 596,556 filed Nov. 23, 1966, now abandoned and 62,098 filed Aug. 7, 1970, now abandoned.

BACKGROUND OF THE INVENTION

Field of the Invention

The present invention relates to a method for the carbonation of sulphide-containing green liquor solutions obtained by chemical recovery in the pulp industry, when digestion is carried out using sodium base.

Description of the Prior Art

A plurality of different methods are known for the recovery of digestion chemicals and for preparing fresh digestion solution. Several chemical recovery methods are based on the liberation of the sulphide of the sodium sulphide containing salt as hydrogen sulphide. The sodium salt freed of sulphide as well as the liberated hydrogen sulphide are thereafter converted to a form corresponding to the intended uses.

It is known that it is necessary in many cases or at least advantageous to treat the sulphide containing solutions with a gas containing carbon dioxide. The object of this so-called precarbonation is to absorb as much carbon dioxide as possible in the solution without liberating any essential amounts of hydrogen sulphide.

For the precarbonation conventional absorption apparatuses are used, usually packed towers which in principle operate in counter current in one stage. A drawback in these towers is that if the absorption of carbon dioxide is increased, more hydrogen sulphide will also be liberated into the flue gases. In order to control the escape of hydrogen sulphide it will be necessary to reduce the ratio of the gas stream to the liquid stream so that the carbon dioxide content of the flue gas approaches zero in which case also the hydrogen sulphide content approaches zero. Since the absorption of carbon dioxide must not decrease, the height of the apparatus must be increased which again means larger investment and operation costs.

Venemark has described three different types of precarbonation apparatuses in his U.S. Pat. No. 3,331,732. The first of them comprises a plurality of mixer-equipped pressure vessels coupled in series with a base tower. This arrangement is very expensive with respect to both investment and operation costs. In spite of the great height of the system the effluent gas is stated to be only "practically free" of hydrogen sulphide while the carbon dioxide content is only about 2%. It should be noted that at the time when Venemark invented his process, hydrogen sulphide was not recognized to be so dangerous as it is today, and that a content of 1 to 2% $H_2S$ in effluent gases was not thought to be harmful. The second Venemark alternative represents a conventional apparatus having a one-stage packed tower operating in counter current. The absorption of carbon dioxide is considerably poorer than in the first-mentioned case, and the carbon dioxide content of the effluent gases is about 7% which means a many-times greater hydrogen sulphide content than in the first-mentioned case. The third alternative comprises an apparatus which is expensive with respect to both investment and operation costs, and which allows only very small gas volumes in comparison to the liquid volumes.

Another prior known method is described in the Swedish Pat. No. 162,695, in which carbon dioxide containing gases are passed in several stages countercurrently with sulphide-containing solution to liberate nearly all the sulphide as hydrogen sulphide, which is removed together with the major portion of the carbonation gases prior to the last absorption stage. To increase the hydrogen sulphide content of this gas, which is passed to a hydrogen sulphide conversion step, a portion of the gases from the last but one stage are directed to the last stage, in which it is contacted with untreated sulphide-containing solution, whereby the main portion of the hydrogen sulphide content of the gas is absorbed and the remainder of the gas can be discharged in the atmosphere.

The method is intended for complete carbonation or complete conversion of the sulphide to hydrogen sulphide, and it is thus not adapted for precarbonation. If it were desired to apply it to pre-carbonation, all the gases should be passed to the last stage also, since it is not desired to remove any hydrogen sulphide in a pre-carbonation operation. In this case, because of the similarity of the towers and of the simple counter-current principle, the absorption would take place as in a one-stage tower having a height equal to the sum of the heights of the towers in the different stages. As to the absorption process itself, what has been said above with respect to the one-stage tower applies.

SUMMARY OF THE INVENTION

An object of the present invention is to provide a method for precarbonation of sulphide-containing green liquor solutions obtained from the recovery systems of pulp mills using sodium base digestion, which permits maximal carbon dioxide absorption without liberation of hydrogen sulphide from the sulphide in appreciable amounts, while using an absorption tower the investment and operation costs of which are low.

The method of the invention comprises passing a green liquor solution and carbonation gas countercurrently through an absorption tower. Carbonation gas is absorbed by the green liquor solution in a lower portion of the tower by using packing which increases the contact surface and thus favors maximal absorption and a high volume ratio of gas to solution, sufficient to convert a major portion of the sulphide content of said solution to bisulphide, a carbonate and bicarbonate. A minor portion of the sulphide is liberated as hydrogen sulphide and a substantial portion of the carbon dioxide content of the carbonation gas is left unabsorbed. The liberated hydrogen sulphide rises in admixture with the unabsorbed carbonation gas from the lower portion of the tower and passes to an unpacked upper portion of the tower to which a fine spray of droplets of fresh green liquor solution is introduced for selectively reabsorbing substantially all of the hydrogen sulphide into the fresh green liquor solution as bisulphide. Carbonated solution is removed from the absorption tower. A plurality of upper and lower portions could also be used if desired.

The term high volume ratio has been used to indicate that more gas is fed in that the liquid is capable of absorbing. In the practice of the invention the gas fed in normally contains at least twice, and usually three times the amount of carbon dioxide that the green liquor is capable of absorbing. In other words the absorption is less than 50% and generally less than 30%. In such a case the change of partial pressure of the $CO_2$ between the lower and upper portions of the tower is better than it would be if a tower were used in which a major portion of the $CO_2$ content of the gas is absorbed. For example, in the prior art process of the above mentioned Venemark patent, 75–95% of incoming $CO_2$ is absorbed, and therefore the partial pressure of the $CO_2$ decreases greatly. It is noted that the height of the tower of the invention can accordingly be lower than in the prior art, pressure losses are minimized and the investment costs are much more favorable, because of this small difference in partial pressure.

The method of the invention may be carried out in an apparatus comprising an absorption tower having first inlet means for supplying green liquor and first outlet means for removing gas at the upper end of the tower and also second inlet means for supplying carbonation gas and second outlet means for removing carbonated solution at the lower end of the tower. A suitable tower has a lower portion having means for increasing the surface area of said green liquor solution exposed to the carbonation gas, and the upper portion being empty.

The method according to the invention is based on the following known reactions:

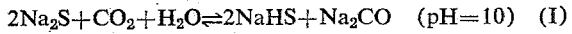

$2Na_2S + CO_2 + H_2O \rightleftharpoons 2NaHS + Na_2CO$ (pH=10) (I)

$NaHS + CO_2 + H_2O \rightleftharpoons HaHCO_3 + H_2S$ (pH<10) (II)

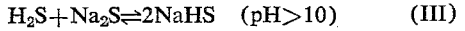

$H_2S + Na_2S \rightleftharpoons 2NaHS$ (pH>10) (III)

Accordingly the reaction conditions are at first controlled so as to obtain maximal carbon dioxide absorption, the reaction I thus proceeding entirely from the left to the right. Simultaneously some hydrogen sulphide liberation occurs locally according to reaction II. Subsequently the hydrogen sulphide-containing gas is scrubbed with unreacted green liquor solution whereby reaction III occurs and the main portion of the hydrogen sulphide is reabsorbed as bisulphide.

In a kinetic respect the invention is based on the different absorption properties of carbon dioxide and hydrogen sulphide respectively. In the absorption of carbon dioxide in solutions containing sodium sulphide the resistance of the liquid film dominates. Therefore the lower portion of the tower is provided with packing which causes the resistance of the liquid film to be decreased and the absorption of carbon dioxide to be increased correspondingly.

In the absorption of hydrogen sulphide by solutions containing sodium sulphide on the other hand, the resistance of the gas film dominates. For this reason, the sulphide-containing solution is caused to meet the sulphide-containing gas stream in the unpacked portion of the tower in the form of sprayed-in droplets under which conditions the resistance of the gas film is the smallest. In the empty portion of the tower the $H_2S$ is essentially all taken up by the green liquor.

In an apparatus of the above described type a selective absorption of carbon dioxide takes place in the first-mentioned packed portion of the tower, and in the last mentioned unpacked or empty portion of the tower a selective absorption of hydrogen sulphide takes place. Under these circumstances it is possible to use a high volume ratio of gas to liquid and to keep the carbon dioxide content or the absorption driving force great, so that it is possible to use a small and correspondingly less expensive apparatus.

The control of the reaction conditions is carried out principally by regulating the feeding rates of the green liquor solution and the carbon dioxide containing gas respectively in proper relation to each other, and by pH control. When desired, automatic control based on continuous pH measurements can be provided. In practice it has, however, been found that it is possible quite satisfactorily to control the progress of the reaction on the basis of pH measurements carried out less frequently, e.g. only once a day. For good results the temperature must also be maintained at a range advantageous for the reaction, e.g. between 25° C. and 40° C.

SHORT DESCRIPTION OF THE DRAWING

The accompanying drawing illustrates schematically an apparatus for carrying out the method of the invention.

DESCRIPTION OF THE PREFERRED EMBODIMENT

While it is understood that the method of the invention may be carried out either as a two-stage process or as a process comprising a plurality of two-stage sequences, the following description with reference to the drawing refers to a two-stage embodiment of the method.

In the drawing a towerlike apparatus 1 is shown, with a feed line 2 for green liquor solution leading to the upper portion 6 of the apparatus 1. The feed line 2 terminates in a spray nozzle 3 for spraying green liquor solution into the unpacked power portion 6. A feed line 4 for carbon dioxide containing gas leads to the lower portion of tower 1. The lower portion 5 of the tower 1 is provided with an absorption promoting, contact surface increasing packing, consisting of e.g. Raschig rings, while the upper portion 6 of the tower is empty. The zone 5 thus serves as an absorption stage, where carbon dioxide is efficiently absorbed in accordance with reaction I stated above. A portion of the carbonated liquid which collects at the bottom of tower 1 can be recycled by means of a circulation pump 7 through a line 8 provided with a spray nozzle 9, to the top portion of absorption stage 5.

After passing the absorption stage 5, due to the reactions which occured therein according to what has been set forth hereinbefore (see reaction II above) the gas contains hydrogen sulphide. The gas passes to the empty portion 6 of the tower, where it is scrubbed with fresh green liquor solution coming from above, whereby the principal portion of the hydrogen sulphide contained in the gas is reabsorbed. Thereafter the gas passes through a drop separator 10 to the top of the tower and out to the atmosphere through a vent pipe 11. The carbonated solution on the other hand is removed as an overflow from the lower portion of tower 1 either directly or preferably controlled through the pump 7 and a line 12.

In practice it has been found that the volume of the empty portion 6 of the tower 1 may be from about 40% to 180% of the volume of the packed portion 5. The height of the lower portion 5 of the tower is dependent on the requirements of the carbon dioxide absorption. Economic factors are mostly decisive for the dimensioning of this portion. If the relative carbon dioxide absorption (absorbed $CO_2$/amount $Na_2S$ in the liquor) is raised, the relative energy and investment costs (energy and investment costs/absorbed $CO_2$) will also increase. Further, the choice of packing influences the height of the packed portion 5. Depending upon whether a packing of plastics or ceramics is chosen, the height of the packed portion 5 may vary considerably although the carbon dioxide absorption remains unchanged.

The absolute height of the unpacked portion 6 of the tower may not be directly stated because it depends on the properties of the equipment—in the first place the spray nozzles 3 and 9 and their position. Normally the height of the portion 6 is about 10–15 feet or a multiple of this height. The reason for this is that the efficient range of the spray tower is limited to a certain distance which is dependent on the properties of the nozzles 3 and 9. Therefore it would not be useful to extend the unpacked portion 6 over this range. Likewise it would not be useful to make the height less than this effective range. The reaction in the upper portion 6 proceeds in dependence upon the surface area of liquid droplets per unit volume. The size of the upper portion 6 also depends to some extent upon the linear velocity of the gases passing therethrough, but this velocity is determined by the dimensions of the lower portion 5 of the tower. The height of the empty portion 6 of the tower has been readily determined by performing a pilot test with the selected type of spray nozzle 9, which makes calculations based upon characteristics of the packing material unnecessary, although this calculation could be easily done by those skilled in the art. Thus in Example 1 below a suitable ratio of packed to unpacked height was slightly less than unity. The flexibility of the process which permits the use of any suitable packing material is an important advantage of the invention.

Numerous experiments have shown the importance of using an unpacked upper portion in the tower in accordance with the invention. In one such experiment the spray inlet 3 for fresh green liquor was lowered to the same level as the nozzle 9 for recirculated liquor in the tower shown in the drawing. The tower was operated at the same degree of absorption. With the spray nozzle 3 located as illustrated the $H_2S$ content of the effluent gases was 0.01% by volume. After lowering the nozzle 3 to the same level as the nozzle 9 the percentage of $H_2S$ is the effluent gases increased to 1.7%. This reduction of emitted $H_2S$ by a factor of 170 clearly demonstrates the importance of spraying green liquor into an unpacked upper portion of the tower.

The process operates efficiently at normal atmospheric pressure, or at a very slight overpressure, usually below 0.005 kg./cm.$^2$. The superatmospheric pressure never exceeds 0.01 kg./cm.$^2$.

If the method of the invention is carried out as a multistage process, a plate tower or column is advantageously utilized, each plate then comprising one stage. The number of plates is selected to reach the desired degree of absorption. The mode of operation otherwise fully corresponds to what has been set forth above.

The following examples are given to illustrate the invention. Gas percentages are by volume.

EXAMPLE 1

In a precarbonation apparatus in accordance with the drawing having a diameter of 2.0 m. and wherein the height of the packed portion is 5.5 m. and the height of the unpacked or spray portion is 6 m., green liquor which had been obtained by dissolving the smelt from the recovery furnace of a pulp mill was carbonated. The concentration of the green liquor was 108 g. of $Na_2S$ per liter and 104 g. of $Na_2CO_3$ per liter, and the feed was 7.9 m.$^3$/h. The flue gas used for the carbonation had a carbon dioxide content of 13.1% on the infeed side and 9.0% on the outfeed side of the tower respectively, and the feed was 3600 Nm.$^3$/h. of dry gas. The absorption of carbon dioxide was 21.0 NM.$^3$ per cubic meter of green liquor. In the effluent gases a hydrogen sulphide content of 0.02% or equal to 200 p.p.m. was measured.

EXAMPLE 2

In the same tower that was used in Example 1, but used as a single stage and entirely filled with packing, a similar pre-carbonation was carried out. The concentration of the green liquor was 112 grams of $Na_2S$ per liter 103 grams of $Na_2CO_3$ per liter. 334 normal cubic meters of flue gases were used for each cubic meter of green liquor. The flue gas contained 13.64% of carbon dioxide when entering and 10.99% carbon dioxide and 1.31% of hydrogen sulphide when leaving the tower. Therefore each cubic meter of green liquor has absorbed 9.9 normal cubic meters of pure hydrogen sulphide while only 87% of its sulphur was retained as sulphide and 13% was lost as hydrogen sulphide causing a sulphur loss of the same magnitude.

There results illustrate the decisive advantages the method of the present invention, as illustrated by Example 1, has in comparison with conventional methods. The use of a tower having an empty upper portion is clearly far superior to use of a substantially fully packed tower as in Example 2.

The tower of Example 2 is comparable to that of Example 1, but greatly superior results are obtained with the arrangement of Example 1. In Example 1, the V/L ratio, calculated on a basis of mol vapor/mol liquid is:

Upper portion V/L=0.407 mol/mol
Lower portion V/L=0.085 mol/mol

In Example 2 the ratio is:

Whole tower V/L=0.058 mol/mol

By another mode of calculations in Example 1:

$$\frac{3600\text{ normal cubic meters gas}}{7.9\text{ cubic meter green liquor}}=445$$

and in Example 2:

$$\frac{334\text{ normal cubic meters gas}}{1\text{ cubic meter green liquor}}=334$$

These differences are relatively minor. However, due to selective reabsorption of liberated hydrogen sulphide by the green liquor sprayed into the unpacked portion of the tower in Example 1, the quantity of $H_2S$ released is greatly reduced. More than 65 times as much $H_2S$ in percentage by volume was present in the effluent gas from the fully packed tower of Example 2, where such selective reabsorption did not occur. Spraying the green liquor into the tower to contact the rising gases in the unpacked upper tower portion provides for highly effective $H_2S$ absorption, and of course such good contact of gases with green liquor cannot be achieved in a fully packed tower.

What is claimed is:

1. A method for the carbonation of sulphide-containing green liquor solutions obtained from the recovery systems of pulp mills using sodium base digestion comprising passing green liquor solution through an obsorption tower counter-currently to a flow of carbonation gas containing at least twice the amount of carbon dioxide that the green liquor is capable of absorbing feeding said carbonation gas into a lower portion of said tower packed with contact surface increasing packing, contacting said carbonation gas with said green liquor in said lower portion, said amount of gas being sufficient to convert the sulphide content of said solution to bisulphide, carbonate and bicarbonate while liberating a minor portion only of said sulphide content as hydrogen sulphide allowing unabsorbed carbon dioxide and said liberated hydrogen sulphide to pass upward into an unpacked upper portion of said tower, spraying further fresh green liquor solution from above so that fine droplets of green liquor solution contact the gases rising in the unpacked upper tower portion, selectively reabsorbing substantially all of said hydrogen sulphide in said fresh green liquor solution as bisulphide; maintaining a temperature favorable to the reactions in the range of about 25° to 40° C.; removing carbonated solution from the tower.

2. The method of claim 1 wherein said fresh green liquor is sprayed from nozzles mounted near the top of said upper tower portion, and some of the carbonated solution removed is recycled and sprayed into the tower from nozzles mounted near the bottom of said upper tower portion.

References Cited
UNITED STATES PATENTS

| | | | |
|---|---|---|---|
| 3,331,732 | 7/1967 | Venemark | 162—30 |
| 3,508,863 | 4/1970 | Kiminki et al. | 162—30 |
| 3,026,240 | 3/1962 | Matty | 423—209 |
| 3,003,908 | 10/1961 | Mannbro | 162—33 |
| 3,471,249 | 10/1969 | Markant | 423—232 |
| 2,788,273 | 4/1957 | Shick | 162—36 |
| 3,650,888 | 3/1972 | Fogman et al. | 162—30 |

S. LEON BASHORE, Primary Exminer

A. D'ANDREA, JR., Assistant Examiner

U.S. Cl. X.R.

162—30; 423—209, 220

UNITED STATES PATENT OFFICE
CERTIFICATE OF CORRECTION

Patent No. 3,841,961      Dated October 15, 1974

Inventor(s) ERIK VIKTOR SAIHA

It is certified that error appears in the above-identified patent and that said Letters Patent are hereby corrected as shown below:

Col. 3, line 44, in equation (II), "HaHCO$_3$" should be --NaHCO$_3$--.

Col. 3, line 67, "gase" should be --gas--.

Claim 1, line 4, "obsorption" should be --absorption--.

Signed and sealed this 22nd day of April 1975.

(SEAL)
Attest:

RUTH C. MASON
Attesting Officer

C. MARSHALL DANN
Commissioner of Patents
and Trademarks